US012759706B2

(12) United States Patent
Diks-Warmerdam et al.

(10) Patent No.: US 12,759,706 B2
(45) Date of Patent: Oct. 13, 2026

(54) CONTAINER FOR STORING AND SERVING FROZEN CONFECTIONERY ITEMS

(71) Applicant: Magnum ICC US, LLC, Wilmington, DE (US)

(72) Inventors: Leonie Martine Diks-Warmerdam, Maassluis (NL); Johannes Krieg, Rotterdam (NL)

(73) Assignee: MAGNUM ICC US, LLC, Wilmington, DE (US)

( * ) Notice: Subject to any disclaimer, the term of this patent is extended or adjusted under 35 U.S.C. 154(b) by 287 days.

(21) Appl. No.: 17/610,790

(22) PCT Filed: May 5, 2020

(86) PCT No.: PCT/EP2020/062473

§ 371 (c)(1),
(2) Date: Nov. 12, 2021

(87) PCT Pub. No.: WO2020/229236

PCT Pub. Date: Nov. 19, 2020

(65) Prior Publication Data

US 2022/0242568 A1 Aug. 4, 2022

(30) Foreign Application Priority Data

May 14, 2019 (EP) .................................... 19174511

(51) Int. Cl.
*B64D 11/00* (2006.01)
*A47J 41/00* (2006.01)
(Continued)

(52) U.S. Cl.
CPC ....... *B64D 11/0007* (2013.01); *A47J 41/0044* (2013.01); *A47J 41/0061* (2013.01); *F25D 3/06* (2013.01); *F25D 11/006* (2013.01)

(58) Field of Classification Search
CPC .............. A47J 41/0044; A47J 41/0061; B64D 11/0007; F25D 3/06; F25F 11/006
See application file for complete search history.

(56) References Cited

U.S. PATENT DOCUMENTS 2,165,327 A 7/1939 Philip
4,296,426 A 10/1981 Gilles
(Continued)

FOREIGN PATENT DOCUMENTS

AU 2014382728 8/2016
CN 102213529 10/2011
(Continued)

OTHER PUBLICATIONS

Search Report and Written Opinion in PCTEP2020063082; Jul. 23, 2020.
(Continued)

*Primary Examiner* — Eric S Ruppert
*Assistant Examiner* — Hans R Weiland
(74) *Attorney, Agent, or Firm* — Bond, Schoeneck & King, PLLC

(57) ABSTRACT

A thermally insulated container for storing and serving frozen confectionery items, wherein the container is preferably arranged to be removably mounted within a service cart, such as an inflight service cart.

20 Claims, 6 Drawing Sheets

(51) Int. Cl.
*F25D 3/06* (2006.01)
*F25D 11/00* (2006.01)

(56) References Cited

U.S. PATENT DOCUMENTS

| | | | | |
|---|---|---|---|---|
| 4,528,439 | A * | 7/1985 | Marney, Jr. | A47J 41/005 252/72 |
| 4,898,294 | A | 2/1990 | Jennings | |
| 8,763,811 | B2 | 7/2014 | Lantz | |
| 9,303,912 | B1 | 4/2016 | Schalla et al. | |
| 9,731,895 | B2 | 8/2017 | Manning | |
| 10,046,901 | B1 | 8/2018 | Jobe | |
| 10,168,090 | B1 | 1/2019 | Chapman, Jr. | |
| 10,266,332 | B2 | 4/2019 | Aksan | |
| 11,046,500 | B2 | 6/2021 | Collison | |
| 11,078,008 | B2 | 8/2021 | Dankbaar | |
| 11,199,354 | B2 | 12/2021 | Geitz | |
| 11,828,516 | B2 | 11/2023 | Sun | |
| 2003/0111472 | A1 | 6/2003 | Lerner | |
| 2003/0131623 | A1 | 7/2003 | Suppes | |
| 2006/0006621 | A1 | 1/2006 | Santa Cruz et al. | |
| 2009/0078708 | A1 | 3/2009 | Williams | |
| 2010/0170287 | A1* | 7/2010 | Boss | F25D 3/005 312/249.8 |
| 2011/0277489 | A1 | 11/2011 | Schalla et al. | |
| 2014/0021208 | A1* | 1/2014 | Anti | F25D 3/125 220/592.25 |
| 2014/0054297 | A1* | 2/2014 | Patstone | F25D 11/003 220/592.01 |
| 2014/0263835 | A1 | 9/2014 | Godecker et al. | |
| 2014/0331946 | A1 | 11/2014 | Eilemann et al. | |
| 2015/0143818 | A1 | 5/2015 | Eckhoff | |
| 2015/0191192 | A1 | 7/2015 | Savage et al. | |
| 2016/0320080 | A1 | 11/2016 | Hieke | |
| 2016/0362240 | A1 | 12/2016 | Ferracamo, Jr. | |
| 2017/0023290 | A1* | 1/2017 | Demuth | F25D 11/003 |
| 2017/0297717 | A1 | 10/2017 | Moran et al. | |
| 2018/0282049 | A1* | 10/2018 | Tumber | B65D 81/383 |
| 2018/0339838 | A1 | 11/2018 | Hall | |
| 2018/0346122 | A1* | 12/2018 | Kzrak | B64D 11/0007 |
| 2019/0162639 | A1 | 5/2019 | Gutelius | |
| 2020/0161616 | A1 | 5/2020 | Chen | |
| 2020/0290790 | A1 | 9/2020 | Mowery | |
| 2021/0300665 | A1 | 9/2021 | Mechor | |
| 2022/0087254 | A1 | 3/2022 | Bixon | |

FOREIGN PATENT DOCUMENTS

| | | | | |
|---|---|---|---|---|
| CN | 102379532 | | 11/2011 | |
| CN | 102607235 | | 7/2012 | |
| CN | 103988045 | | 8/2014 | |
| CN | 203958959 | | 11/2014 | |
| CN | 104709603 | A | 6/2015 | |
| CN | 204937738 | | 1/2016 | |
| CN | 205947109 | | 2/2017 | |
| CN | 206485792 | U | 9/2017 | |
| CN | 206761922 | | 12/2017 | |
| CN | 108602562 | | 9/2018 | |
| CN | 109455410 | A | 3/2019 | |
| CN | 209209482 | | 8/2019 | |
| CN | 209312826 | | 8/2019 | |
| DE | 29611084 | | 11/1996 | |
| EP | 2700891 | | 2/2014 | |
| GB | 2534909 | A | 8/2016 | |
| GB | 2535149 | A | 8/2016 | |
| GB | 2543837 | | 5/2017 | |
| JP | 2012102744 | | 5/2012 | |
| JP | 2012131539 | | 7/2012 | |
| JP | 2013085550 | | 5/2013 | |
| JP | 2016084149 | | 5/2016 | |
| KR | 100836844 | | 6/2008 | |
| KR | 101457029 | | 10/2014 | |
| WO | WO-03083386 | A1 * | 10/2003 | A23G 9/225 |
| WO | WO08104639 | | 9/2008 | |
| WO | WO2008107657 | | 9/2008 | |
| WO | WO12056086 | | 5/2012 | |
| WO | WO2015120911 | | 8/2015 | |
| WO | WO2017072508 | | 5/2017 | |
| WO | WO2019161426 | | 8/2019 | |

OTHER PUBLICATIONS

Search Report and Written Opinion in EP19174511; Oct. 25, 2019.
Search Report and Written Opinoin in EP19174506; Oct. 25, 2019P.
Search Report and Written Opinion in EP19213453; May 25, 2020.
Search Report and Written Opinion in EP19213454; Jun. 4, 2020.
Search Report and Written Opinion in PCTEP2020062473; Jul. 23, 2020.
Search Report and Written Opinion in PCTEP2020081401; Feb. 3, 2021.
Search Report and Written Opinion in PCTEP2020081400; Feb. 3, 2021.
Search Report, CN Patent Application No. 2020800357116, dated Oct. 12, 2022, 1 page.

* cited by examiner

CONTAINER FOR STORING AND SERVING FROZEN CONFECTIONERY ITEMS

FIELD OF THE INVENTION

The present invention relates to a thermally insulated container for storing and serving frozen confectionery items, and particularly to such containers which are designed to be removably mountable within a service cart.

BACKGROUND OF THE INVENTION

Inflight service carts (i.e. wheeled trolleys) are commonly used for storing and dispensing food and beverages on modern commercial aircraft. Such carts facilitate at-seat service of these products during the flight. Similar service carts are used on other modes of transport (e.g. on trains). Keeping the foodstuffs at an appropriate temperature within such carts is a recognised problem.

There is prior art relating to refrigerated storage of foodstuffs within inflight service carts, which largely focuses on maintaining the temperature of the foodstuffs within the chilled range (e.g. +2° C. to +8° C.). Dry ice is typically used as the refrigerant. For example, WO 2012/056086 A1 relates to a refrigerator unit for an inflight service cart which utilises dry ice in such a way that it releases chilled air evenly, and without freezing the products.

The storage of frozen products, such as ice cream and similar frozen confections, has also been addressed by the prior art. U.S. Pat. No. 4,898,294 describes a frozen food container for aircraft usage. The container comprises bottom, end, side and top walls formed of a thermally insulating material contained between an inner and outer shell, the top wall having an insulated lid formed in the forward portion thereof. Preferably the container is provided with one or more receptacles adapted to receive dry ice, with the top wall of the container comprising these dry ice storage chambers.

Using dry ice in containers for storing and serving frozen confectionery items is not ideal. Firstly, such frozen confectionery items are too hard to be consumed directly if kept at −78° C. Secondly, since the dry ice sublimes, it will inevitably need replacing after a single use.

Therefore, there remains a need to provide insulated containers which improve the length of time that the frozen confectionery items can be kept at a suitable temperature in order to ensure that they can be consumed directly on serving. It is preferred that such insulated containers are reusable.

Furthermore, there is a need to achieve this when the frozen confectionery items are stored and served in an environment remote from a storage freezer and/or wherein the container needs to be transportable thus enabling an at-seat service of the frozen confectionery items to passengers (e.g. during a flight or a train journey).

SUMMARY OF THE INVENTION

In a first aspect, the invention relates to a thermally insulated container for storing and serving frozen confectionery items, the container comprising:

a thermally insulated housing defining an insulated chamber, the thermally insulated housing having at least one openable side to allow access to the chamber, a product storage assembly mounted within the insulated chamber, the product storage assembly comprising:

a frame having at least three walls thereby delineating a three-sided perimeter, at least one product container for containing a plurality of the frozen confectionery items, the at least one product container being positioned within the frame, at least a first reservoir of phase change material, positioned in contact with the frame or the product container, wherein the product storage assembly is mounted such that it is separated from the thermally insulated housing by a gap, the gap having a width of 1 mm to 10 mm, wherein the gap is present over at least 80% of the internal surface area of the thermally insulated housing.

In a second aspect, the present invention relates to a method for storing and serving frozen confectionery items using the thermally insulated container of the first aspect, the method comprising:

cooling the reservoir(s) of phase change material to a temperature of less than −6° C.;

mounting the product storage assembly within the insulated chamber of the thermally insulated housing such that the cooled reservoir(s) of phase change material are in contact with the frame or the product container, and the product container is loaded with a plurality of frozen confectionery items; wherein the product storage assembly is mounted such that it is separated from the thermally insulated housing by a gap, the gap having a width of 1 mm to 10 mm, wherein the gap is present over at least 80% of the internal surface area of the thermally insulated housing;

storing the frozen confectionery items within the insulated chamber for a period of up to 24 hours and serving the frozen confectionery items during the storage period by opening the openable side of the thermally insulated housing and removing at least one of the frozen confectionery items from the insulated chamber, and then preferably closing the openable side of the thermally insulated housing.

In a third aspect, the invention relates to a service cart, preferably an inflight service cart, comprising at least one thermally insulated container according to the first aspect of the invention.

DETAILED DESCRIPTION OF THE INVENTION

The present invention relates to a thermally insulated container for storing and serving frozen confectionery items. There is no particular limitation with regard to the type of frozen confectionery items which can be stored and served using the insulated container. Non-limiting examples of frozen confectionery items include ice cream, gelato, frozen yoghurt, sorbet, granita, water ice, and the like. The frozen confectionery items can optionally be enclosed within secondary packaging, such as a cardboard carton.

The thermally insulated storage container of the present invention comprises a thermally insulated housing defining an insulated chamber. The thermally insulated housing is preferably cuboid, with 6 thermally insulated sidewalls delimiting the insulated chamber. The thermally insulated housing has at least one openable side to allow access to the chamber. The thermally insulated chamber is sealed when the openable side is in a closed position and accessible when the openable side is in an open position. It will be apparent that it is not necessary for the entire side to open—merely that a portion of the side is openable so as to allow access to the chamber. Advantageously the openable side is a door component which is hingedly attached to one of the other sides. Additionally or alternatively, at least one of the walls can be a removably engageable lid component. The thermally insulated housing can be made from any suitable material having thermal insulation properties. Preferably, but not exclusively, the thermally insulated housing comprises a material selected from: expanded polypropylene (EPP), polyurethane (PU), Aerogel, and vacuum panels. Suitable thermally insulated housings are described in WO 2008/104639 A1, which is hereby incorporated in its entirety.

The thermal insulated storage container also comprises a product storage assembly mounted within the insulated chamber of the housing. Preferably, the product storage assembly is removably mounted within the housing, since this allows it to be cleaned separately from the housing. However, it is also possible for product storage assembly to be permanently mounted within the housing.

The product storage assembly comprises a frame, at least one product container and at least a first reservoir of phase change material positioned in contact with the frame or the product container. The features of the product storage assembly are described in more detail below.

The product storage assembly comprises a frame having at least three walls thereby delineating a three-sided perimeter. The orientation of the at least three walls will depend on the manner in which the product storage assembly is mounted within the insulated chamber of the housing, as discussed in more detail below. The three-sided perimeter can be a "U" shaped perimeter (e.g. where two opposing walls are connected by an intermediary wall, such as two side walls being connected by an upper wall). It is also possible for the three-sided perimeter to involve the three walls meeting at a vertex (e.g. where a side wall, a rear wall and a lower wall meet, with the side wall being connected to the rear wall along a first edge and to the lower wall along a second edge).

The frame must have at least three walls, but is not limited to only having three walls—in other words the frame can have more than three walls. For example, the frame can have four walls (thereby delineating a four-sided perimeter) or five walls (thereby delineating a five-sided perimeter). This is sometimes preferred, as increasing the number of walls is expected to make the frame more rigid and hence assist in maintaining the gap between the product storage assembly and the thermally insulated housing. Whilst it is possible for the frame to have six walls (thereby delineating a six-sided perimeter), such an arrangement requires that at least one wall of the frame is openable in order to allow access to the product container (and the frozen confectionery items contained therein), and is typically less preferred than arrangements which do not require an openable wall.

The product storage assembly comprises at least one product container for containing a plurality of the frozen confectionery items. The product container is positioned within the frame. In other words, the product container occupies at least part of the three-dimensional space within the 3-sided perimeter of the frame. Any product container which can contain a plurality of frozen confectionery items can be used in the present invention. For example, the product container can be a shelf, a tray, a drawer, a box, a carton, or an insulated bag. For reasons of sustainability, it is preferred that the product container is reusable and sufficiently robust to be cleaned between uses. As such, it is particularly preferred that the product container is a shelf, a tray, or a drawer.

The product storage assembly is mounted such that it is separated from the thermally insulated housing by a gap, the gap having a width of 1 to 10 mm. In order to ensure that the gap is maintained even when the insulated container is subjected to significant vibrations (e.g. such as may be the case if turbulence is encountered), it is preferred that the gap has a width of at least 2 mm, more preferably at least 2.5 mm, and most preferably at least 3 mm. In order to maximise the space available for storing frozen confections within the insulated container, it is preferred that the gap has a width of no more than 8 mm, preferably no more than 6 mm, and most preferably no more than 5 mm.

In order to prevent heat transfer by conduction, it is preferred that the gap is present over a large amount of the internal surface area of the thermally insulated housing. Thus the gap is present over at least 80% of the internal surface area of the thermally insulated housing, preferably over at least 85%, more preferably at least 90% and most preferably over at least 95% of the internal surface area of the thermally insulated housing. Whilst there is no particular limit with regard to how the product assembly is mounted within the insulated chamber, the product assembly will inevitably interact with the internal surface of the thermally insulated housing in at least one location. Therefore, it is not possible to maintain the gap over the entire internal surface area of the thermally insulated housing, and it is unlikely that the gap will be present over more than 99% of the internal surface area of the thermally insulated housing.

The product storage assembly comprises at least a first reservoir of phase change material (such as eutectic material) positioned in contact with the frame or the product container. The precise construction of the reservoir of phase change material is not especially important. For example, the phase change material could be contained within a flexible outer membrane or within a rigid shell.

A rigid shell filled with phase change material is sometimes preferred, as such a shell can have one or more feature(s) which interact with one or more feature(s) of the thermally insulated housing (e.g. protruding side ribs which interact with moulded grooves in the internal surface of the thermally insulated housing). This arrangement allows the product storage assembly to be mounted within the insulated chamber, e.g. by attaching the frame to the surface of the phase change reservoir so that it "hangs" from the reservoir (thus maintaining the gap). In such an arrangement, the feature(s) of the reservoir which interact with the feature(s) of the housing are typically made from a thermally insulating material in order to further prevent heat transfer. A further benefit of using a rigid shell filled with phase change material is that such a shell is typically refillable.

Nevertheless, a flexible outer membrane filled with phase change material is sometimes appropriate. For example, where minimising the space taken up by the reservoir(s) is more important than structural rigidity. Of course, it is also possible to use a mixture of types of reservoirs (e.g. rigid shell(s) in contact with the frame, and flexible membrane(s) in contact with the product container).

The skilled person will be able to select an appropriate phase change material. The melting temperature of the phase change material is preferably −30° C. to −6° C., −27° C. to −12° C., −25° C. to −15° C., or even −22° C. to −18° C. Eutectic material is a preferred example of a suitable phase change material. Melting temperatures at the lower ends of these ranges are preferred where longer storage periods are anticipated (e.g. if the frozen confectionery items are to be served on a long-haul flight), whereas for shorter storage periods a melting temperature at the upper end of these ranges may be more appropriate (e.g. to ensure that the frozen confectionery items are served at a temperature where they can be consumed straight away on removal from the thermally insulated container).

The product assembly preferably comprises a thermally conductive boundary having at least three sides which are in thermal contact with one another during storage of the frozen confectionery items. Where present, this thermally conductive boundary is provided by the frame and/or the product container and the reservoir of phase change material is positioned in thermal contact with the thermal boundary. The thermally conductive boundary can have more than three sides, for example it can have four sides, five sides, or even six sides.

The thermally conductive boundary can be provided by the frame, for example where the at least three walls thereof are made of a conductive material (preferably a lightweight metal such as aluminium or an alloy thereof).

Where the thermally conductive boundary is provided by the frame, the product container can be made from a thermally insulating material. This may be preferred, since it will mitigate the coldness of the product container, making it more pleasant for the person serving the frozen confectionery items to handle. It also allows the product container to be disposable, for example it could simply be a cardboard carton provided as secondary packaging for the frozen confectionery items. However, it is also possible for both the frame and the product container to be made from a conductive material, and such an arrangement is believed to maximise thermal conductivity (and hence ensure that the cooling effect achieved by the reservoir(s) of phase change material is disseminated throughout the product storage assembly). For example, where the product container is a shelf, it may not be necessary for the server to handle the product container at all, and a conductive material may be preferred. Even if the product container is a drawer, it can be made of a conductive material (preferably a lightweight metal such as aluminium or an alloy thereof) and include an insulated front plate to mitigate the coldness. Indeed, it is not even necessary for the entire front plate to be insulated to achieve this—it is sufficient if the portion of the front plate designed to be gripped is insulated.

The thermally conductive boundary can be provided by the product container. An example would be a drawer made of a conductive material (preferably a lightweight metal such as aluminium or an alloy thereof). As discussed above, such a drawer can optionally include a front plate which comprises at least an insulated portion in order to mitigate the coldness for the person handling the drawer when serving the frozen confectionery items. Where the thermally conductive boundary is provided by the product container, the frame can be made from a material with low thermal conductivity (preferably a plastic material such as PVC). This may provide an arrangement that is cheaper and/or more lightweight than one in which both the frame and the product container are made from conductive materials.

Finally, the thermally conductive boundary can be provided by a combination of features from the frame and the product container so long as the thermally conductive boundary has at least three sides which are in thermal contact during storage of the frozen confectionery items. Examples would be an arrangement where the frame comprises conductive sidewalls and the product container is a conductive shelf suspended between the two sidewalls of the frame or an arrangement where the frame is a "C" shaped conductive frame (e.g. where the frame has an upper and a lower wall connected by a back wall), and the product container is a drawer with an conductive base which is in contact with the lower wall of the frame during storage of the frozen confectionery products.

The product storage assembly preferably comprises a second reservoir of phase change material positioned in contact with the frame or the product container. The second reservoir of phase change material is preferably in thermal contact with the thermally conductive boundary (where such a boundary is present). The position of the reservoir(s) of phase change material will be determined based on where sufficient space is available to accommodate the reservoir(s) of phase change material without compromising the gap between the product storage assembly and the insulated housing. For example, the first reservoir of phase change material may be in contact with the frame (e.g. positioned so as to contact an upper, lower or sidewall of the frame), and the second reservoir of phase change material may be in contact with the product container. It is also possible for both the first and second reservoirs of phase change material to be positioned in contact with the frame or to be positioned in contact with the product container.

As discussed above, the reservoir(s) of phase change material are positioned in contact with the frame or the product container. The reservoir(s) can be permanently attached to the frame or the drawer. However, in order to allow more flexibility with regard to cooling the reservoir(s) of phase change material, it is preferred that they are removably attached to the frame or the drawer. This is especially preferred if the reservoir(s) of phase change material are positioned in contact with the frame, as this means that the reservoir(s) of phase change material can be cooled without the need to provide sufficient freezer space for the entire frame assembly (i.e. frame plus reservoir(s) of phase change material).

The thermally insulated storage container of the present invention permits frozen confectionery items to be stored and served without the need for using dry ice as a coolant. Nevertheless, if it is important to store the confectionery items for a prolonged period prior to serving them (e.g. if the frozen confectionery items are to be served on a long-haul flight), then it is preferred that the container comprises dry ice in addition to the reservoir(s) of phase change material. Where dry ice is used, it is preferably positioned in contact with a reservoir of phase change material, for example on top of the first reservoir of phase change material.

The product container is preferably engageable within the frame such that the product container can be moved relative to the frame in a slidable manner between an open position and a closed position. It is also possible for the storage container to comprise a plurality of product containers. For example, this allows different types of frozen confectionery products to be segregated into different product containers to facilitate serving of the correct product.

The frozen confectionery items can optionally be enclosed within secondary packaging, such as a cardboard or paperboard carton. Where such secondary packaging is present, this can be in addition to a product container (i.e. the secondary packaging containing the frozen confectionery items can be placed within/on the product container). Equally, it is envisioned that the secondary packaging containing the frozen confectionery items can be the product container.

The thermally insulated storage container of the present invention is relatively compact, and therefore has particular application where storage space is limited. For example, the container can be used with inflight service carts, which have dimensional challenges due to their need to be stowed during take/off and maneuvered through the narrow aircraft aisles. The arrangement allows frozen confectionery items to be kept remote from a storage freezer for a significant period of time (typically up to 24 hours), and facilitates serving during this storage time. As such, the invention relates to an inflight service cart comprising at least one thermally insulated container according to the first aspect of the invention.

The thermally insulated storage container of the present invention is preferably arranged to be removably mounted within a service cart, preferably an inflight service cart. Inflight service carts have been used for decades on commercial flights. They conventionally take the form of a rigid box, with casters at each corner of the base that can be locked to hold the cart in position. Both full and half size carts are available, which differ in their length: approximately 80 cm for a full size cart and 40 cm for a half size cart. Both full and half size carts are approximately 30 cm wide and around 1 m tall. Doors are typically provided at both the front and back of the cart in the case of full size carts, and just at the front for half size carts. The skilled person would be able to provide an insulated box which could be removably mounted within a conventional inflight service cart. Especially as there are only 3 major configurations of airline service carts available: ACE, ATLAS and KSSU, with each of these configurations being internationally recognised within the airline industry.

The present invention also relates to a method for storing and serving frozen confectionery items using the thermally insulated container of the first aspect of the invention.

The method comprises the step of cooling the reservoir(s) of phase change material to a temperature of less than −6° C. Optionally, the frame and/or the product container can also be cooled to a temperature of less than −6° C. For example, the frame and/or the product container can be cooled to the appropriate temperature with the reservoir(s) of phase change material in situ. Preferably, each reservoir of phase change material is stored for a period of at least 2 hours in a freezer operating below a temperature of −6° C. Preferably, the freezer operates at a temperature below −12° C., more preferably below −15° C. or even below −18° C. The lower limit of the freezer temperature is not especially important, and will largely depend on the operating parameters of the available freezer(s). Whilst there are commercially available freezers which operate at very low temperatures (e.g. below −70° C., such as at −80° C. or even −86° C.), these are mainly found in laboratories and it is more common for freezers to operate down to a temperature of −30° C. A cold store room operating at an appropriate temperature could be used in place of a freezer.

Next, the product storage assembly is mounted within the insulated chamber of the thermally insulated housing such that the cooled reservoir(s) of phase change material are in contact with the frame and/or the product container. The product storage assembly is mounted within the insulated chamber such that it is separated from the thermally insulated housing by a gap, the gap having a width of 1 to 10 mm, wherein the gap is present over at least 80% of the internal surface area of the thermally insulated housing.

A plurality of frozen confectionery items are loaded within the product storage assembly. Where the product container is cooled to a temperature of less than −6° C. alongside the reservoir(s) of phase change material, then the frozen confectionery items can already be loaded into the product container during the cooling step. Alternatively, the frozen confectionery items can be loaded once the product storage assembly (with the reservoir(s) of cooled phase change material in situ) is mounted within the insulated chamber, or whilst the product storage assembly and cooled reservoir(s) of phase change material are being mounted therein.

The frozen confectionery items are stored within the insulated chamber for a period of up to 24 hours. This time period relates to the storage of the frozen confectionery items remote from a freezer. The frozen confectionery items are served during this storage period by opening the openable side of the thermally insulated housing and removing at least one of the frozen confectionery items from the insulated chamber, and then preferably closing the openable side of the thermally insulated housing.

Preferably the frozen confectionery items are loaded into a product container that is engageable with the frame such that the product container can be moved relative to the frame in a slidable manner between an open position and a closed position. The frozen confectionery items can then be served by opening the openable side of the thermally insulated housing, sliding the product container to the open position and removing at least one of the frozen confectionery items, and then preferably sliding the product container to the closed position and closing the openable side of the thermally insulated housing. It will be appreciated that a plurality of product containers can be used (as already discussed above).

The various features of the present invention referred to in individual sections above apply, as appropriate, to other sections mutatis mutandis. Consequently features specified in one section may be combined with features specified in other sections as appropriate.

As used herein the term "comprising" encompasses the terms "consisting essentially of" and "consisting of". Where the term "comprising" is used, the listed steps or options need not be exhaustive. As used herein, the indefinite article "a" or "an" and its corresponding definite article "the" means at least one, or one or more, unless specified otherwise. Unless otherwise specified, numerical ranges expressed in the format "from x to y" are understood to include x and y. In specifying any range of values or amounts, any particular upper value or amount can be associated with any particular lower value or amount. Except in the examples and comparative experiments, or where otherwise explicitly indicated, all numbers are to be understood as modified by the word "about".

FIGURES

By way of example, the present invention is illustrated with reference to the following figures, in which:

FIGS. 1*a* to 1*c* show cross-sectional schematic views of a thermally insulated container according to the invention viewed from the front. Specifically, FIGS. 1*a* and 1*b* show elements which are assembled to provide the container shown in FIG. 1*c*.

FIG. 1*d* shows a cross-sectional schematic view of arrangement A from Example 1 viewed from the front.

FIGS. 2*a*, 2*b* and 2*c* show cross-sectional views of the three arrangements assessed in Example 2 viewed from the front.

FIGS. 3*a* to 3*b* are cross-sectional views which schematically illustrate further insulated containers according to the invention viewed from the front.

FIGS. 4*a*, 4*c* and 4*e* are cross-sectional views which schematically illustrate additional insulated containers according to the invention viewed from the side.

FIGS. 4*b*, 4*d* and 4*f* are cross-sectional views which schematically illustrate the insulated containers of FIGS. 4*a*, 4*c* and 4*e* viewed from the front.

Figure 1A:
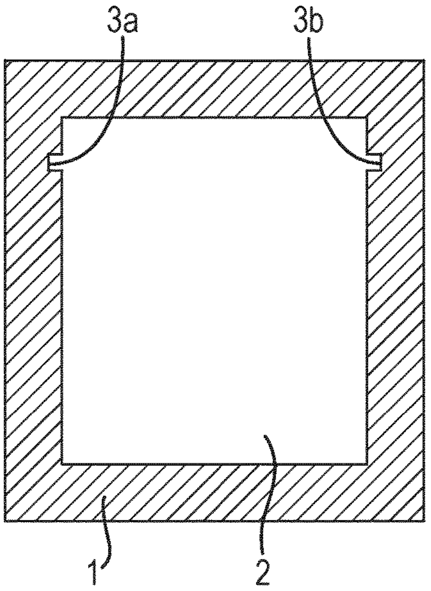

FIG. 1*a* is a cross-sectional view of a thermally insulated housing (1) defining an insulated chamber (2) viewed from the front. The thermally insulated outer housing (1) is made of EPP, and has a hinged front panel (not shown) to allow access to the insulated chamber (2). The outer housing (1) has two moulded grooves (3*a*, 3*b*). It will be appreciated that further groove(s) could additionally be present.

Figure 1B:
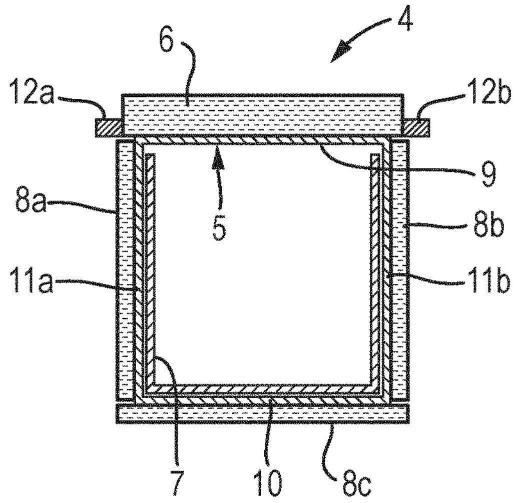
Figure 1C:
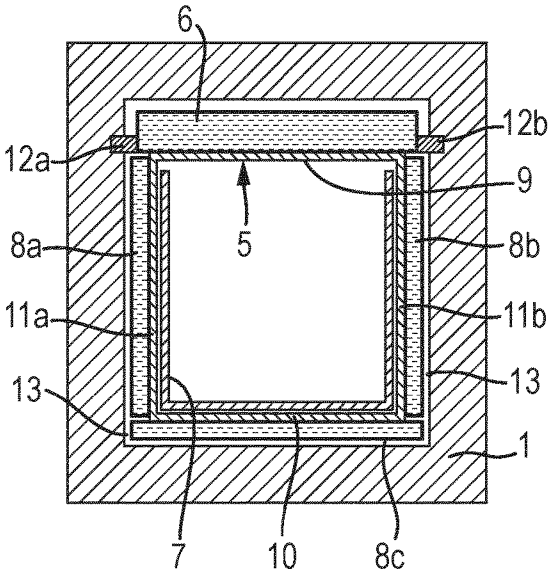

FIG. 1*b* is a cross-sectional view of a product storage assembly (4) which includes a frame (5), a first reservoir of phase change material (6), a product container (7) —in this case a product drawer—and three additional reservoirs of phase change material (8*a*, 8*b*, 8*c*). The frame (5) has an upper wall (9) and a lower wall (10) which are connected by two side walls (11*a*, 11*b*); the frame additionally comprises a rear wall (not shown) and thereby delineating a five-sided boundary. Each of the reservoirs of phase change material (6, 8*a*, 8*b*, 8*c*) consists of a rigid plastic shell filled with phase change material, preferably eutectic material. The upper wall (9) of the frame (5) is attached to the plastic shell of the first reservoir of phase change material (6). This ensures that the first reservoir of phase change material (6) is in contact with the frame (5). The rigid shell of the first reservoir of phase change material (6) has two protruding side ribs (12*a*, 12*b*). These ribs (12*a*, 12*b*) interact with the moulded grooves (3*a*, 3*b*) of the housing, as can be seen in FIG. 1*c*. The product drawer sits on the lower wall (10) of the frame (5). The sidewalls (11*a*, 11*b*) and the lower wall (10) of the frame are each attached to one of the three additional reservoirs of phase change material (8*a*, 8*b*, 8*c*). Thus, the additional reservoirs of phase change material (8*a*, 8*b*, 8*c*) are also in contact with the frame (5).

FIG. 1*c* is a cross-sectional view of a thermally insulated container according to the invention which has been assembled by mounting the product storage assembly (4) of FIG. 1*b* within the thermally insulated housing (1) of FIG. 1*a*. More precisely, the product storage assembly (4) has been mounted within the thermally insulated housing (1) by engaging the protruding side ribs (12*a*, 12*b*) with the moulded grooves (3*a*, 3*b*). Since the upper wall (9) of the frame (5) is attached to the shell of the first reservoir of phase change material (6), the frame (5) "hangs" within the thermally insulated chamber (2). This allows the product storage assembly (4) to be mounted within the insulated chamber (2) such that there is an air gap (13) between the thermally insulated housing (1) and the product storage assembly (4). There is an air gap of 2 to 3 mm around all sides of the assembly. The only contact points between the product storage assembly (4) and the thermally insulated housing (1) of FIG. 1*a* are the side ribs (12*a*, 12*b*) and the moulded grooves (3*a*, 3*b*). Since the side ribs (12*a*, 12*b*) are made from a thermally insulating material, there is little thermal energy transfer between the first reservoir of phase change material (6) and the outer housing (1).

Figure 1D:
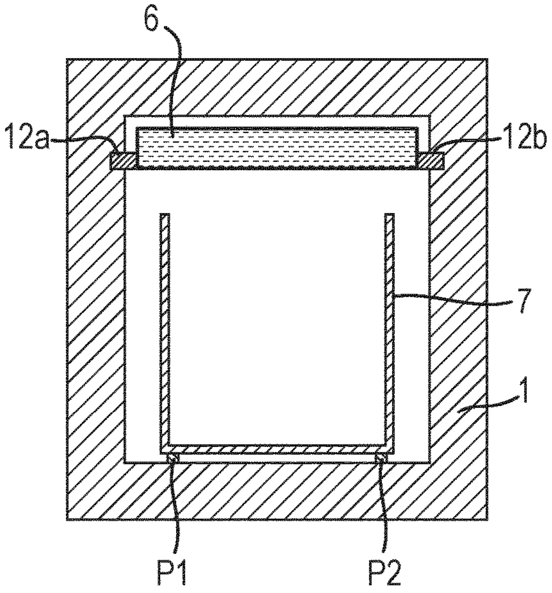

FIG. 1*d* shows a cross-sectional schematic view of the control arrangement from Example 1. This arrangement includes a first reservoir of phase change material (6) and a product container (7). However, there is no frame (5). The product container (7) —in this case a product drawer—sits on two thin strips of polystyrene (P1, P2) placed on the base of the insulated housing (1).

Figure 2C:
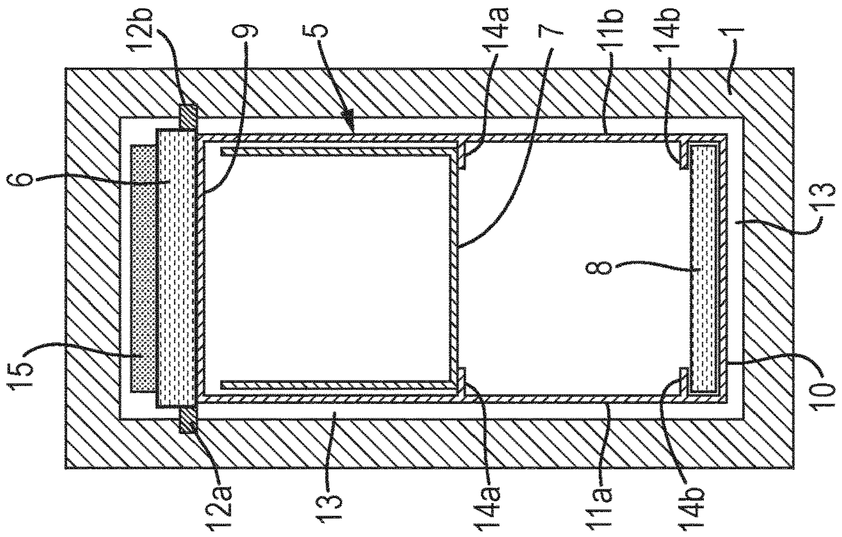
Figure 2B:
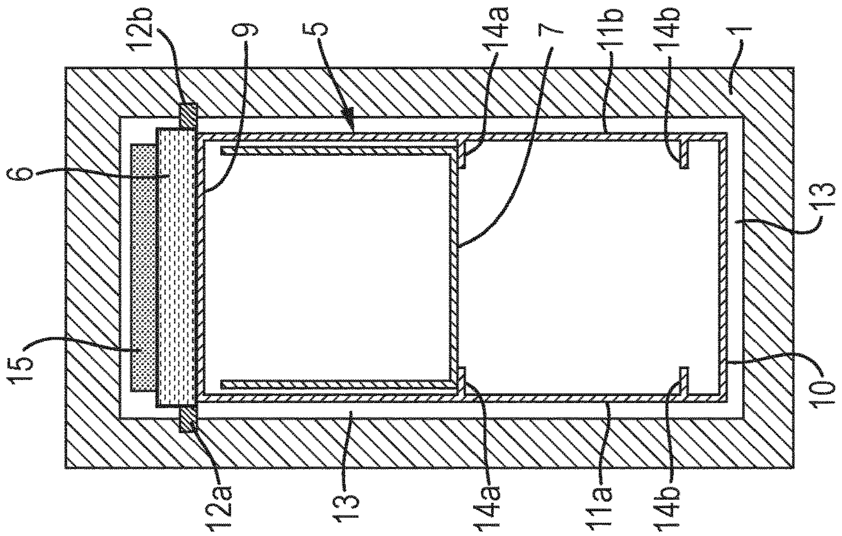
Figure 2A:
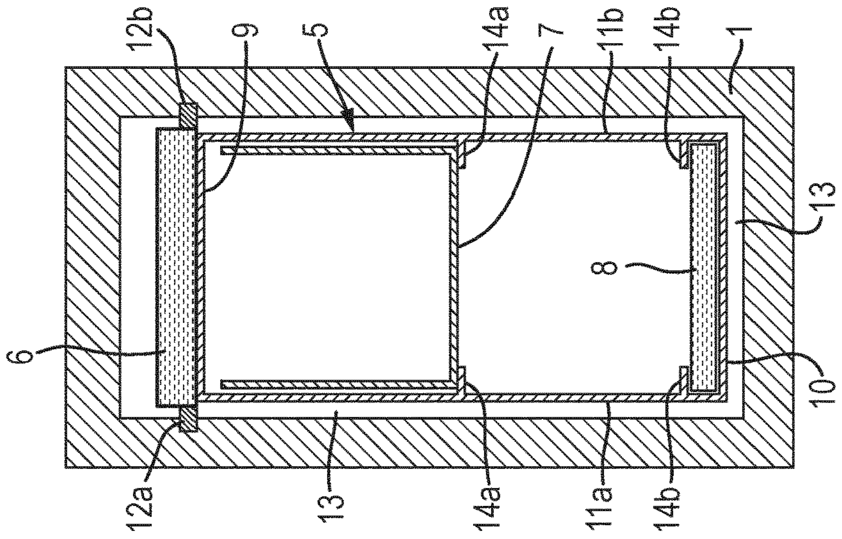

FIGS. 2*a*, 2*b* and 2*c* show cross-sectional views of further thermally insulated containers viewed from the front. In each case, the thermally insulated housing (1) is made of EPP, and has a hinged front panel (not shown) to allow access to the insulated chamber (2). The frame (5) is made from aluminium and has a thickness of 2 mm. The frame (5) has an upper wall (9) and a lower wall (10) which are connected by two side walls (11*a*, 11*b*), thereby delineating a four-sided thermally conductive boundary. In addition, each side wall (11*a*, 11*b*) has a projection (14*a*). These projections (14*a*) support product container (7) (in this case a product drawer), thereby enabling the product container to slide between a closed position (where it is enclosed within the frame) and an open position. Of course, the projections (14*a*) could equally support a shelf (not shown). The product drawer (7) is made of aluminium and can hold a plurality of frozen confectionery items (not shown). Only a single product drawer (7) is shown in each of FIGS. 2*a*, 2*b* and 2*c*. Nevertheless, it will be appreciated that an additional product drawer could be positioned in the lower part of the frame, i.e. supported by projections (14*b*).

The first reservoir of phase change material (6) has the same construction as that described above in relation to FIG. 1, and the frame (5) is attached to it in the same manner. Once again, the rigid shell of the first reservoir of phase change material (6) has two protruding side ribs (12*a*, 12*b*), which interact with moulded grooves of the outer housing, thus enabling the frame to "hang" within the insulated chamber such that there is an air gap (13) between the thermally insulated outer housing (1) and the thermally conductive inner frame (5). There is an air gap of 2 to 3 mm around all sides of the frame. The only contact points between the product storage assembly (i.e. frame (5)+first reservoir of phase change material (6)+product drawer (7)) and the housing (1), are the ribs (12*a*, 12*b*) and the moulded grooves (3*a*, 3*b*). As such, there is an air gap (13) present between the product storage assembly (4) and the outer housing (1).

The thermally insulated containers of FIGS. 2*a* and 2*c* both include a second reservoir of phase change material (8), which is positioned in the lower part of the frame—specifically so as to contact the lower wall (10) of the frame (5). As such, it will be apparent that the second reservoir of phase change material (8) is in thermal contact with the thermally conductive boundary provided by the frame (5). Should an additional product drawer be provided in either of these containers, it would be positioned in the lower part of the frame, i.e. supported by projections (14*b*). Of course, projections (14*b*) are not essential, and it will be apparent that these projections could be omitted from the arrangements. For example, if these projections (14*b*) were omitted from the arrangement of FIG. 2*b*, then there would be additional space for the product drawer (7) since it would now sit on the lower wall (10) of the frame (5).

The thermally insulated containers of FIGS. 2*b* and 2*c* both include dry ice (15), which is positioned on top of the first reservoir of phase change material (6).

FIGS. 3*a* to 3*d* are schematic cross-sectional views which illustrate further insulated containers according to the invention (as viewed from the front).

Figure 3A:
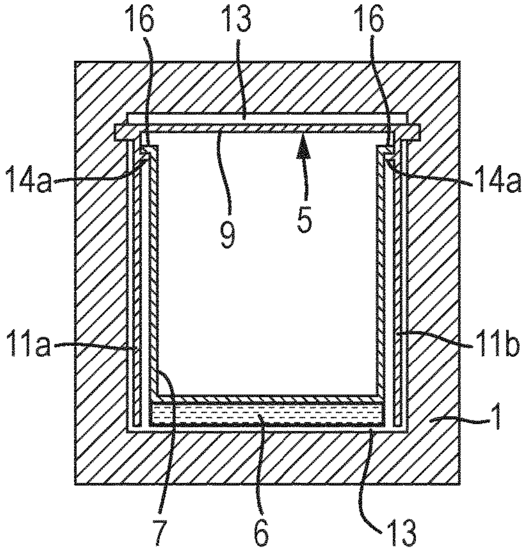

FIG. 3*a* shows an insulated housing (1) with a three-sided frame (5) mounted therein. The frame (5) has two side walls (11*a*, 11*b*) connected by upper wall (9), thereby delineating a three-sided perimeter. The upper wall (9) interacts with the moulded grooves of the outer housing (1), thus enabling the frame to "hang" within the insulated chamber. The only contact points between the product storage assembly and the insulated housing (1) are where the upper wall (9) interacts with the moulded grooves. Each sidewall (11*a*, 11*b*) has a projection (14*a*). Product drawer (7) has a ridge (16) at the upper edge of each side, and engages with the projections (14*a*) of the frame (5) in a slidable manner by way of these ridges (16) such that the product drawer (7) is suspended from the frame (5). The first reservoir of phase change material (6) is attached to the base of the product drawer (7). Although not shown, it will be apparent that the first reservoir of phase change material (6) could simply be placed in the base of the product drawer (7).

Figure 3B:
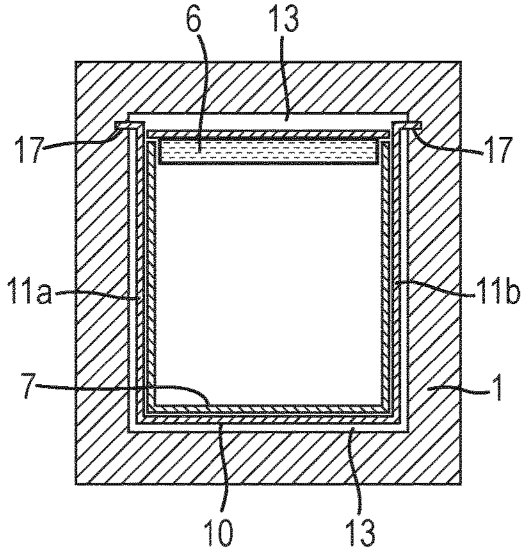

FIG. 3*b* illustrates an insulated housing (1) with a different version of a three-sided frame (5) mounted therein. In this instance, the frame (5) has two side walls (11*a*, 11*b*) connected by lower wall (10), thereby delineating a three-sided perimeter. The frame (5) is shaped so as to have arms (17) which interact with moulded grooves of the outer housing (1), thus enabling the frame to "hang" within the insulated chamber such that there is an air gap (13) between the thermally insulated outer housing (1) and the frame (5). Product drawer (7) sits on the lower wall (10) of the frame (5). The first reservoir of phase change material (6) is provided in the format of a removeable lid which closes the top of the product drawer (7). The lid can be removed to allow access to the products within the drawer (7).

Figure 3C:
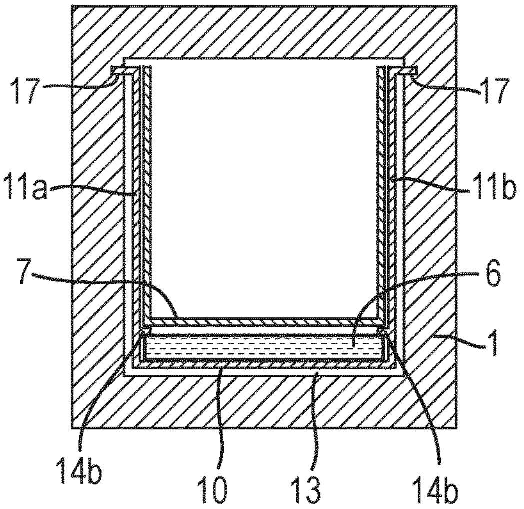

FIG. 3*c* shows another possible arrangement of a product storage assembly mounted within an insulated housing (1). The frame is similar to that described above with reference to FIG. 3*b*, only in this instance each side wall (11*a*, 11*b*) has a projection (14*b*). These projections (14*b*) support product drawer (7), thereby enabling the product container to slide between a closed position (where it is enclosed within the frame) and an open position. The first reservoir of phase change material (6) contacts the lower wall (10) of the frame (5). The projections (14*b*) prevent the product drawer (7) contacting the first reservoir of phase change material (6).

Figure 3D:
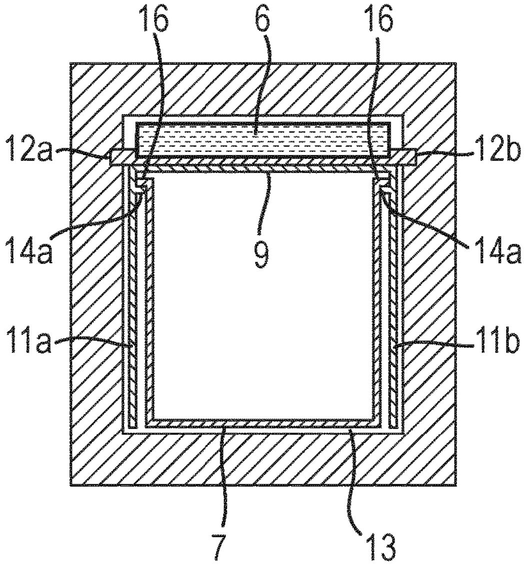

FIG. 3*d* shows an insulated housing (1) with a three-sided frame (5) mounted therein. The frame (5) has two side walls (11*a*, 11*b*) connected by upper wall (9), thereby delineating a three-sided perimeter. Each sidewall (11*a*, 11*b*) has a projection (14*a*). The first reservoir of phase change material (6) has the same construction as that described above in relation to FIG. 1, and the frame (5) is attached to it in the same manner. Once again, the rigid shell of the first reservoir of phase change material (6) has two protruding side ribs (12*a*, 12*b*), which interact with moulded grooves of the outer housing, and the frame to "hangs" within the insulated chamber. These are the only contact points between the housing (1) and the product storage assembly (4). Product drawer (7) has the same construction as described above with reference to FIG. 3*a*, and engages with the projections (14*a*) of the frame (5) in a slidable manner by way of ridges (16) such that the product drawer (7) is suspended from the frame (5).

FIG. 4 shows a series of cross-sectional views which schematically illustrate additional insulated containers according to the invention. Since the gap (13) must be present over at least 80% of the internal surface area of the thermally insulated housing, it may be necessary to include a feature which helps to prevent the front of the drawer from contacting the housing. For example, the frame may include a releasable catch which interacts with the drawer (7) holding it in the closed position. Additionally or alternatively, the door component (18) may include a projection which abuts against the drawer (7) to hold it in its closed position when the door component is closed.

Figure 4A:
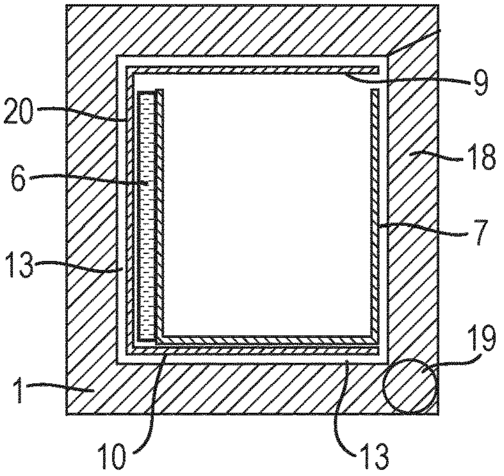
Figure 4B:
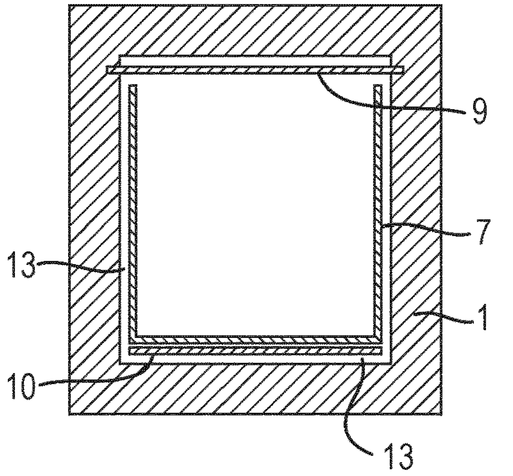

FIG. 4*a* illustrates a first such insulated container viewed from the side. FIG. 4*b* shows the same container viewed from the front. The insulated housing (1) has an openable side in the format of a door component (18), which moves between open and closed positions via hinge (19). The openable side (18) is shown in the closed position. The container includes a three-sided frame (5), having an upper wall (9) and a lower wall (10) connected by rear wall (20), thereby delineating a three-sided perimeter. The upper wall (9) interacts with moulded grooves in the outer housing (1), thus enabling the frame (5) to "hang" within the insulated chamber (2), and maintaining a gap (13) between the product storage assembly. The only contact points between the product storage assembly and the insulated housing (1) are where the upper wall (9) interacts with the moulded grooves. Product drawer (7) sits on the lower wall (10) of the frame (5). The first reservoir of phase change material (6) is attached to the rear wall of the of the product drawer (7). It is possible for the lower wall (10) of the frame (5) to include a lip (not shown) along at least a portion of each of the sides to help keep the drawer (7) in position.

Figure 4C:
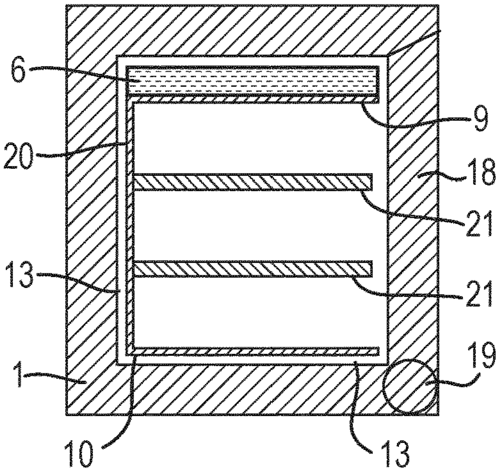
Figure 4D:
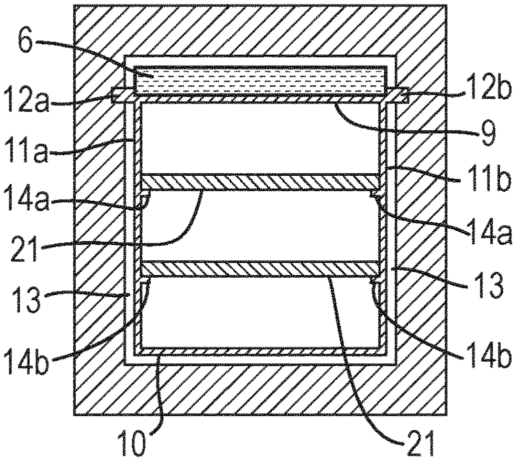

FIG. 4*c* illustrates a further insulated container viewed from the side. FIG. 4*d* shows the same container viewed from the front. The insulated housing (1) has an openable side in the format of a door component (18), which moves between open and closed positions via hinge (19). The container includes a five-sided frame (5), having an upper wall (9) and a lower wall (10) connected by rear wall (20) and by two side walls (11*a*, 11*b*), thereby delineating a five-sided perimeter. The first reservoir of phase change material (6) has the same construction as that described above in relation to FIG. 1, and the frame (5) is attached to it in the same manner. Once again, the rigid shell of the first reservoir of phase change material (6) has two protruding side ribs (12*a*, 12*b*), which interact with moulded grooves of the outer housing, and the frame to "hangs" within the insulated chamber. These are the only contact points between the housing (1) and the product storage assembly (4). In this instance the product containers are shelves (21), which are supported on projections (14*a*, 14*b*) on the side walls (11*a*, 11*b*).

Figure 4E:
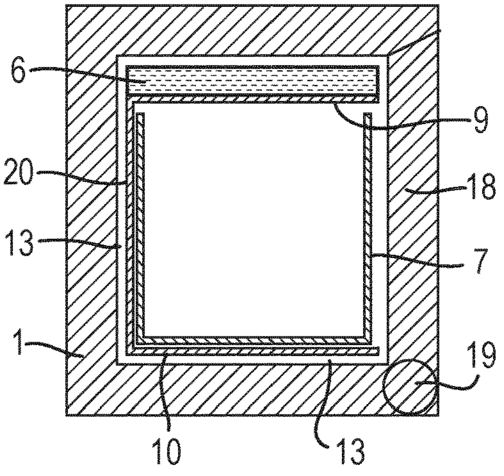
Figure 4F:
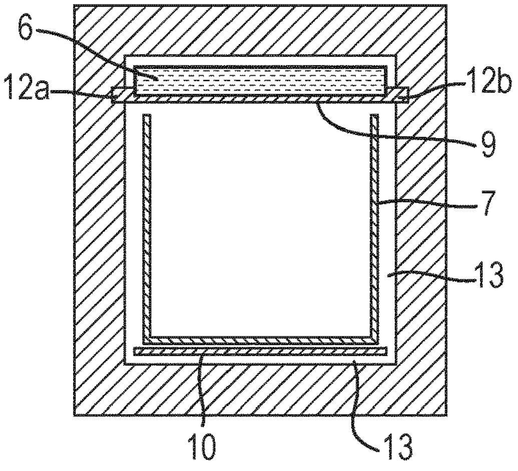

FIG. 4*e* illustrates a further example of an insulated container viewed from the side. FIG. 4*f* shows the same container viewed from the front. The insulated housing (1) has an openable side in the format of a door component (18), which moves between open and closed positions via hinge (19). The container includes a three-sided frame (5), having an upper wall (9) and a lower wall (10) connected by rear wall (20), thereby delineating a three-sided perimeter. The first reservoir of phase change material (6) has the same construction as that described above in relation to FIG. 1, and the frame (5) is attached to it in the same manner. Once again, the rigid shell of the first reservoir of phase change material (6) has two protruding side ribs (12*a*, 12*b*), which interact with moulded grooves of the outer housing, and the frame to "hangs" within the insulated chamber so as to maintain gap (13). These are the only contact points between the housing (1) and the product storage assembly (4). Product drawer (7) sits on the lower wall (10) of the frame (5). Once again, it is possible for the lower wall (10) of the frame (5) to include a lip (not shown) along at least a portion of each of the sides to help keep the drawer (7) in position.

Figure 5:
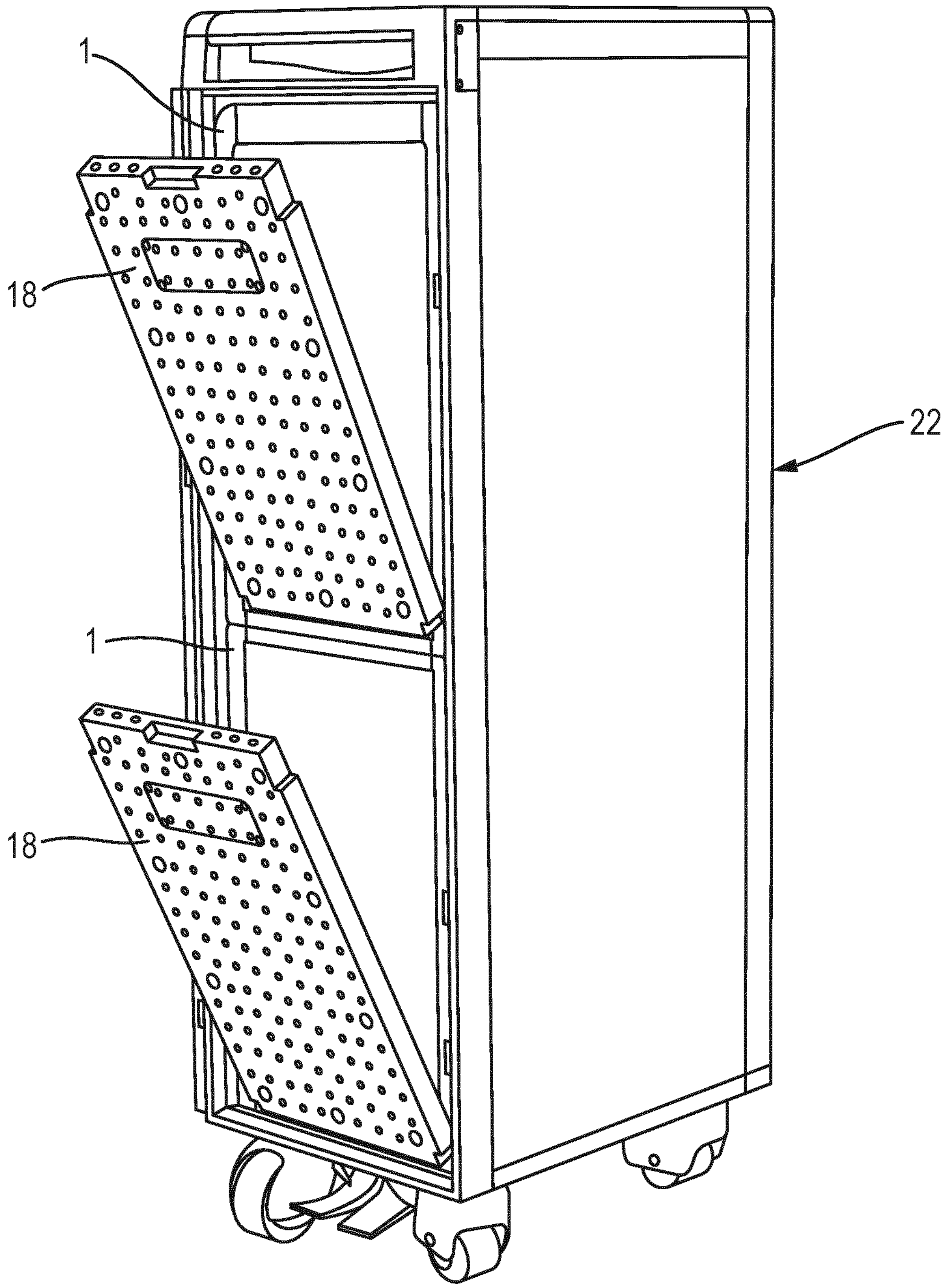
FIG. 5 is a perspective view of a service cart containing two insulated containers.

FIG. 5 is a perspective view of a service cart (22) with two insulated outer housings (1) mounted therein (one above the other). In this view the reservoirs of phase change material and the inner frame are not in situ. Each outer housing (1) comprises a hinged door component (18) which is openable to allow access to the insulated chamber (2).

The invention is not limited to the embodiments illustrated in the figures. Accordingly, it should be understood that where features mentioned in the claims are followed by reference numerals, such numerals are included solely for the purpose of enhancing the intelligibility of the claims and are in no way limiting to the scope of the claims.

The following examples are intended to illustrate the invention and are not intended to limit the invention to those examples per se.

EXAMPLES

In Examples 1 and 2 the thermally insulated housing was an insulated EPP box with a hinged front panel to allow access to the insulated chamber (ATLAS 1/3 cooling chest in Example 1; ATLAS 1/2 chest in Example 2; both from Icebridge Cooling Solutions). In both examples, the first reservoir of phase change material was provided by filling a plastic cooling cassette (Icebridge Cooling Solutions) with 1.3 kg eutectic material (E-19 from PCM Products Ltd; phase change temperature −18.7° C.). The cassettes are designed to be received by the insulated boxes and have protruding ribs extending along each side which are received by corresponding grooves moulded into the internal walls of the insulated housing.

Example 1

The properties of three thermally insulated container arrangements were investigated. All three arrangements include a first reservoir of phase change material provided by filling a plastic cooling cassette with 1.3 kg eutectic material as set out above.

Arrangement 1 is illustrated in FIG. 1*c* and has an air gap of 2 to 3 mm around all sides of the product storage assembly. Two versions of this arrangement were compared: one with a five-sided PVC frame and one with a 5-sided aluminium frame. In both cases, additional reservoirs of phase change material were attached to the rear wall, bottom wall and side walls of the frame and the front of the product drawer (totalling 1.677 kg of additional eutectic material). In the version of arrangement 1 with the aluminium frame, the product drawer had an aluminium plate between the front of the product drawer and the reservoir of phase change material attached thereto. Arrangement 1 maintains the gap around all sides of the product storage assembly, even with the presence of the additional reservoirs of phase change material. In other words, neither the frame nor the additional reservoirs of phase change material contact the insulated casing in arrangement 1.

Arrangement A differs from arrangement 1 in that there is no frame present. This arrangement includes a first reservoir of phase change material. There is no reservoir of phase change material in contact with the product drawer in arrangement A.

Each of the arrangements in this example included a plastic (PVC) product drawer for holding the frozen confectionery items. In arrangement 1 the product drawer was slidably received within the frame, whereas in arrangement A the product drawer rests on two thin strips of polystyrene placed on the base of the insulated container. This ensures that there is an air gap between the insulated housing and the drawer.

The arrangements were tested side by side at room temperature (20° C.). Each one was loaded with 30 frozen confectionery items (Magnum classic minis, 50 g) and then sealed and monitored for 24 hours with temperature measurements being taken throughout the monitoring period.

Figure 6:
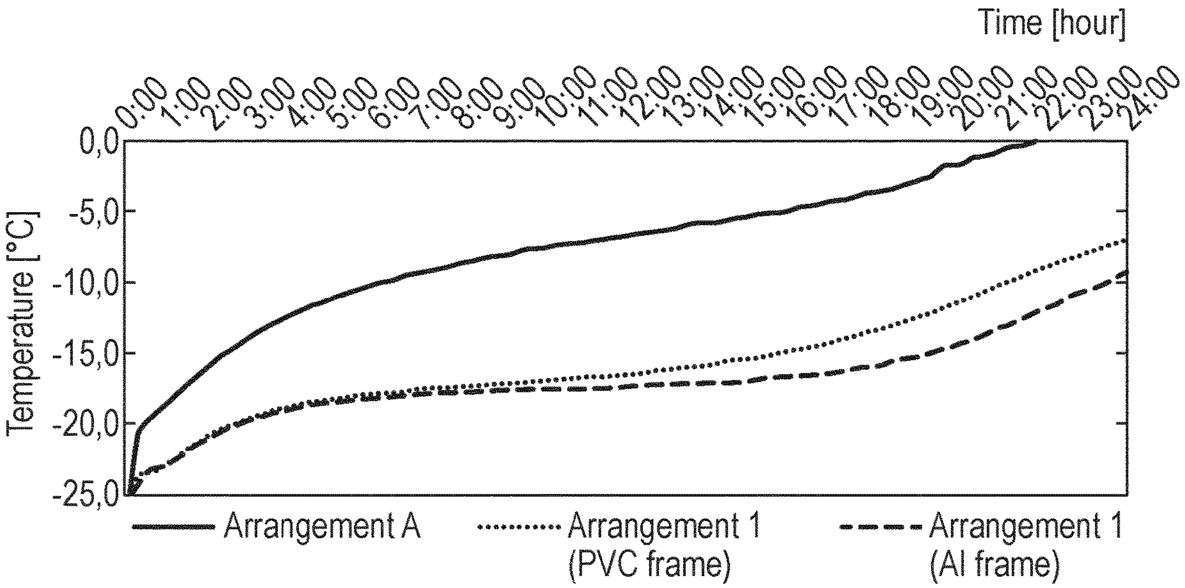
FIG. 6 shows the average temperature curves for the arrangements of Example 1.

The average temperature measurements of the three arrangements are shown in FIG. 6. Arrangement 1 (PVC frame) took 4.5 hours longer to reach −18° C. than arrangement A, and 13.3 hours longer to reach −15° C. Similarly, arrangement 1 (Al frame) took 5.6 hours longer to reach −18° C. than arrangement A, and 17 hours longer to reach −15° C. Therefore, arrangement 1 (with a PVC frame) provided temperature stability between −18° C. and −15° C. for 10 hours, whilst the same arrangement with an aluminium frame provided temperature stability between −18° C. and −15° C. for 12.5 hours.

Example 2

The properties of three thermally insulated container arrangements were investigated. In each arrangement, the frame is a four-sided aluminium frame mounted such that there is an air gap of 2 to 3 mm around all sides of the frame and there is an aluminium product drawer in the upper portion of the frame (i.e. supported by projections from the sidewalls).

Arrangement 2 is illustrated in FIG. 2*a* and includes a second reservoir of phase change material (containing 1.3 kg of E-19 from PCM Products Ltd; phase change temperature −18.7° C.). The second reservoir of phase change material is placed inside the frame and is in contact with lower wall of the frame.

Arrangement 3 is illustrated in FIG. 2*b* and includes dry ice (0.6 kg) which is placed on top of the first reservoir of phase change material. The dry ice does not touch the insulated outer housing.

Arrangement 4 is illustrated in FIG. 2*c* and includes both dry ice (0.6 kg) and a second reservoir of phase change material (containing 1.3 kg of E-19 from PCM Products Ltd; phase change temperature −18.7° C.). The dry ice is placed on top of the first reservoir of phase change material and does not touch the insulated outer housing. The second reservoir of phase change material is placed inside the frame and is in contact with lower wall of the frame.

Before being used in the arrangements of this example, each reservoir of phase change material was cooled so that all of the phase change material was solid (i.e. >24 hours in a freezer operating at −32° C.).

The arrangements were tested side by side at room temperature (20° C.). Each one was loaded with 60 frozen confectionery items (Magnum classic minis, 50 g) —30 of which were placed in the product drawer and 30 of which were placed in the lower portion of the frame. The arrangements were sealed and monitored for 21 hours with temperature measurements being taken throughout the monitoring period.

Figure 7:
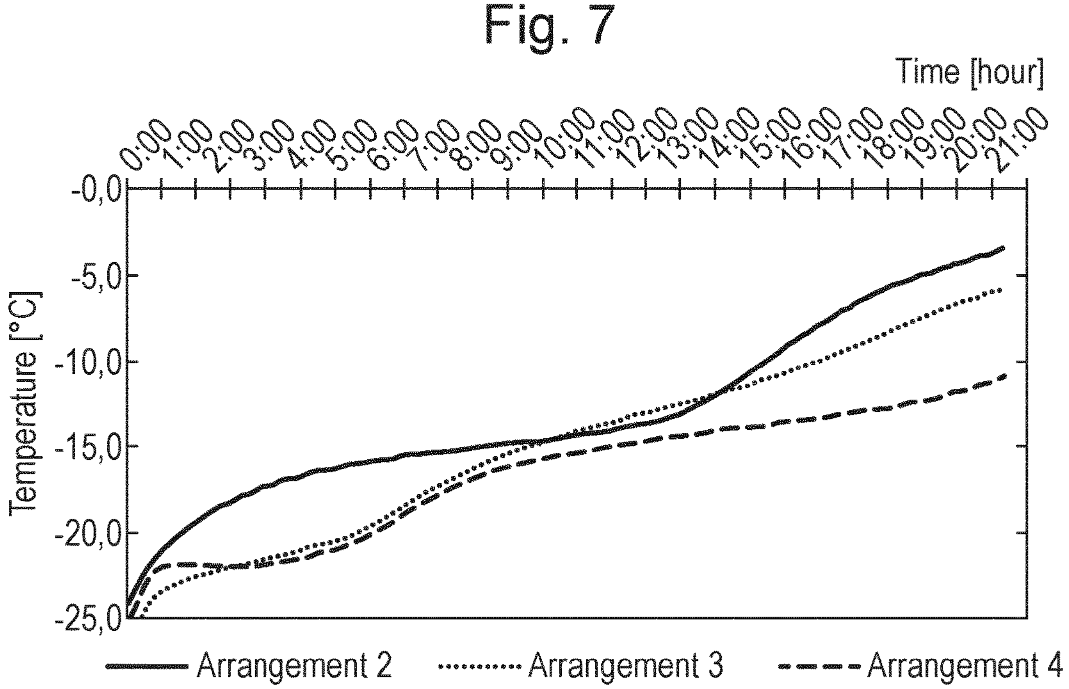
FIG. 7 shows the average temperature curves for the arrangements of Example 2.

The average temperature measurements of the three arrangements are shown in FIG. 7. It can be seen that arrangement 2 (with a first and second reservoir of phase change material) has a stable temperature profile between 4 and 13 hours. This represents a window in which the frozen confectionery items can be served and be at a suitable temperature for immediate consumption. The temperature profile of arrangement 3 (with a first reservoir of phase change material and dry ice) indicates that it is possible to increase the initial storage period (i.e. at a temperature below −18° C.) to around 5 hours. After this period, the frozen confectionery items will be at a temperature where they can be served for immediate consumption. However, once this temperature is reached, the window during which the frozen confectionery products can be served is narrower than it is for arrangement 2. Finally, it can be seen that arrangement 4 (with a first and second reservoir of phase change material and dry ice) has both the increased initial storage period (i.e. at a temperature below −18° C.) of around 5 hours, and a stable temperature profile between around 7 and 16 hours. This represents a window in which the frozen confectionery items can be served and be at a suitable temperature for immediate consumption.

In conclusion, the use of two reservoirs of phase change material increases the length of the window in which the frozen confectionery products can be served and be at a suitable temperature for immediate consumption. The use of dry ice increases the initial storage period (i.e. the period in which the frozen confectionery items are too cold to be suitable for immediate consumption). This may be useful, since there will inevitably be a period during which the frozen confectionery items are stored whilst being transported to the plane, and in any case, service of such items will not begin until the aircraft is airborne.

The invention claimed is:

1. A thermally insulated container for storing and serving frozen confectionery items, the container comprising:

a thermally insulated housing defining an insulated chamber, the thermally insulated housing having at least one openable side to allow access to the chamber;

a product storage assembly mounted within the insulated chamber, the product storage assembly comprising:

a frame having at least three walls thereby delineating a three-sided perimeter;

at least one product container for containing a plurality of the frozen confectionery items, the at least one product container being positioned within the frame;

at least a first reservoir of phase change material, positioned in contact with the frame or the at least one product container;

wherein the product storage assembly is mounted such that it is separated from the thermally insulated housing by an air gap, the air gap having a width of 1 mm to 10 mm, wherein the air gap extends around all sides of the at least one product container and is present over at least 80 percent of the internal surface area of the thermally insulated housing and wherein the at least one product container is engageable within the frame such that the at least one product container can be moved relative to the frame in a slidable manner.

2. The thermally insulated container as claimed in claim 1, wherein the air gap is present over at least 90% of the internal surface area of the thermally insulated housing.

3. The thermally insulated container as claimed in claim 1, wherein the product storage assembly comprises a thermally conductive boundary having at least three sides which are in thermal contact with one another during storage of the frozen confectionery items, the thermally conductive boundary being provided by the frame and/or the at least one product container and wherein the reservoir of phase change material is positioned in thermal contact with the thermally conductive boundary.

4. The thermally insulated container as claimed in claim 3, wherein the at least one product container provides the thermally conductive boundary.

5. The thermally insulated container as claimed in claim 3, wherein the frame provides the thermally conductive boundary.

6. The thermally insulated container as claimed in claim 1, wherein the frame has four or five walls thereby delineating a four-sided or five-sided perimeter.

7. The thermally insulated container as claimed in claim 1, wherein the air gap has a width of 2 to 8 mm.

8. The thermally insulated container as claimed in claim 1, wherein the product storage assembly additionally comprises a second reservoir of phase change material positioned in contact with the frame or the at least one product container.

9. The thermally insulated container as claimed in claim 1, wherein the container additionally comprises dry ice positioned in contact with the reservoir of phase change material.

10. The thermally insulated container as claimed in claim 1, wherein the at least one product container is a shelf, a tray, a drawer, a box, a carton, or an insulated bag.

11. The thermally insulated container as claimed in claim 10, wherein the at least one product container is engageable with the frame such that the at least one product container can be moved relative to the frame in a slidable manner between an open position and a closed position.

12. The thermally insulated container as claimed in claim 10, wherein the at least one product container is engageable with the frame such that the at least one product container can be moved relative to the frame in a slidable manner between an open position and a closed position.

13. A service cart comprising at least one insulated container as claimed in claim 1.

14. A method for storing and serving frozen confectionery items using a thermally insulated container as claimed in claim 1, the method comprising:

cooling the reservoir(s) of phase change material to a temperature of less than −6° C.;

mounting the product storage assembly within the insulated chamber of the thermally insulated housing such that the cooled reservoir(s) of phase change material are in contact with the frame or the at least one product container and the at least one product container is loaded with a plurality of frozen confectionery items; wherein the product storage assembly is mounted such that it is separated from the thermally insulated housing by a gap, the gap having a width of 1 mm to 10 mm, wherein the gap is present over at least 80% of the internal surface area of the thermally insulated housing;

storing the frozen confectionery items within the insulated chamber for a period of up to 24 hours and serving the frozen confectionery items during the storage period by opening the openable side of the thermally insulated housing and removing at least one of the frozen confectionery items from the insulated chamber, and then closing the openable side of the thermally insulated housing.

15. A method for storing and serving frozen confectionery items as claimed in claim 14, wherein:

the frozen confectionery items are loaded into a product container that is engageable with the frame such that the product container can be moved relative to the frame in a slidable manner between an open position and a closed position; and the frozen confectionery items are served by opening the openable side of the thermally insulated housing, sliding the product container to the open position and removing at least one of the frozen confectionery items.

16. The thermally insulated container as claimed in claim 1, wherein the gap is present over at least 95% of the internal surface area of the thermally insulated housing.

17. The thermally insulated container according to claim 1, wherein the product storage assembly is mounted within the insulated chamber by hanging.

18. The thermally insulated container according to claim 1, wherein six thermally insulated walls delimiting the insulated chamber.

19. The thermally insulated container according to claim 1, wherein the frame comprises two opposing walls connected by an intermediary wall.

20. Thermally insulated container as claimed in claim 19, wherein the product container comprises a drawer, a box, a carton, or an insulated bag.

* * * * *